June 2, 1970      J. J. CHISHOLM      3,515,489

OPTICAL APPARATUS

Filed March 3, 1966      2 Sheets-Sheet 1

JAMES J. CHISHOLM
INVENTOR.

BY *Charles C. Krawczyk*

ATTORNEY

June 2, 1970  J. J. CHISHOLM  3,515,489
OPTICAL APPARATUS
Filed March 3, 1966  2 Sheets-Sheet 2
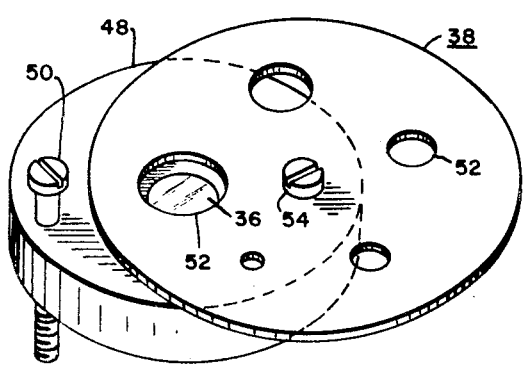
FIG. 2
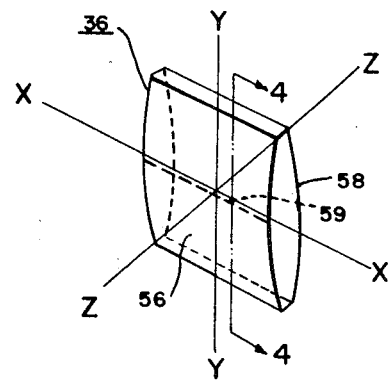
FIG. 3
FIG. 4
FIG. 5
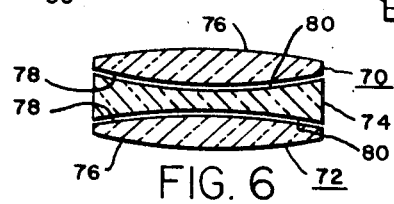
FIG. 6
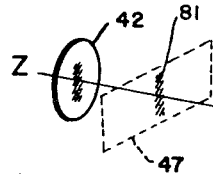
FIG. 7
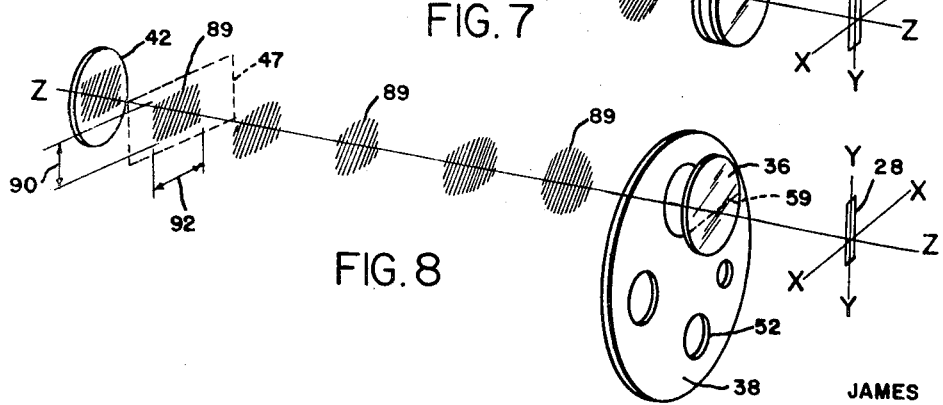
FIG. 8
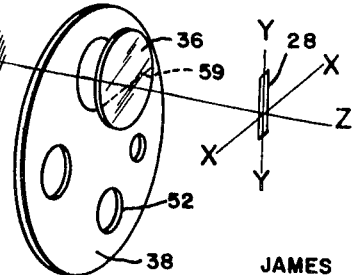
JAMES J. CHISHOLM
INVENTOR.
BY Charles C. Krawczyk
ATTORNEY United States Patent Office 3,515,489
Patented June 2, 1970

3,515,489
OPTICAL APPARATUS
James J. Chisholm, Rochester, N.Y., assignor to Bausch & Lomb Incorporated, Rochester, N.Y., a corporation of New York
Filed Mar. 3, 1966, Ser. No. 531,508
Int. Cl. G01n 21/22
U.S. Cl. 356—201    4 Claims

ABSTRACT OF THE DISCLOSURE

Disclosed is an optical system for a photometer wherein there is provided means for effectively collimating radiation rays from a source of radiation having an elongated shape. The system is further characterized in that use is made of a pseudo collimating effect for controlling the path of incident radiation. Pseudo collimating is achieved by a lens of a particular combination of surface configurations to effectively collimate the rays emanating from the source through a sample compartment.

---

This invention relates to optical apparatus in general and more particularly to optical apparatus for photometers and the like.

Instruments such as photometers and spectrophotometers, etc. are generally used to measure the radiation transmittance or absorbance of a test sample. The compartment for containing the test sample, or the sample itself generally includes a pair of parallel sides mounted to be normal to an incident beam of radiation to minimize wave front distortion. Radiation is transmitted through the test sample and its response thereto is detected by a radiation sensitive device. In the case of small samples, the samples are generally placed at an image plane so that a maximum amount of light energy is focused on a minimum cross sectional area of the sample. This provides a maximum signal to noise ratio for small samples. On the other hand, when larger samples having a thickness ($t$) and an index of refraction ($n$) are placed in a focused beam, the focal position shifts by an amount $\Delta F$ which can be approximated as $$\Delta F \cong t\left(\frac{n-1}{n}\right)$$

This focal shift causes the beam of radiation to alter its size and intensity distribution on the radiation sensitive device (e.g. the photocathode of photomultiplier tube. Radiation sensitive devices are notoriously non-uniform regarding spatial sensitivity and therefore it is advantageous to effectively irradiate the same portion of the radiation sensitive device to keep its sensitivity substantially constant.

In single beam photometers, the focusing effect of liquid test samples can be virtually eliminated, for test purposes, by calibrating the system with a liquid sample having an index of refraction and thickness that approaches the test sample, and comparing the response of the known sample with that of the test sample. The focal effect of both the known sample and the test sample will be approximately the same and therefore effectively eliminated for testing purposes. On the other hand if testing solids, the apparatus is generally calibrated with an empty test chamber and the solid sample compared thereto. In such cases, the sample exhibits a focusing effect on the beam depending, upon its index of refraction, and thereby introducing a source of error in the measurements thereof.

The focusing effect of large test samples can be minimized by applying a collimated test beam thereto so that the rays impinging on the samples are substantially normal to its surface and pass therethrough unperturbed. True collimation can only be achieved with a point type source of radiation. Any departure from the point type source produces a diverging beam beyond the collimating lens. In apparatus such as inferometers, automobile headlights, search lights, etc. a compromise solution is generally made by using "high brightness" (large output from small area) light sources or by diminishing the area of the source with a pinhole aperture. This light source is then placed in the focal plane and centered on the optical axis of the collimating lens thereby minimizing the divergence of the rays to a tolerable amount. On the other hand, in photometric type instruments such as a spectrophotometer, a monochromator is generally used to provide spectral isolation. In such cases, the source of radiation generally takes the form of an elongated rectangular exit slit.

The exit slit in the monochromator effectively acts as a field stop, the width of which determines the amount of radiant flux transmitted and the wavelength band width of the beam of radiation. Two important characteristics determining the capabilities of a spectrophotometer are its signal to noise ratio and its ability to resolve fine spectral detail. If the slit width is altered to enhance one of these characteristics, the other characteristic is adversely affected. However, when the slit height is increased a greater signal to noise ratio can be achieved without appreciably degrading the resolution capabilities of the spectrophotometer. For this reason it is conventional to employ slits in a spectrophotometer that have a much greater height than width. Unfortunately such slits present serious difficulties when the beam of radiation transmitted from the slit is to be collimated. Standard type collimating lenses cannot be effectively used in conjunction with a slit source since the beam of radiation in a plane containing the length of the slit rapidly diverges beyond the lens thereby introducing the above mentioned sources of error.

It is therefore an object of this invention to provide a new and improved pseudo collimating lens for photometers and the like that effectively collimates radiation from an elongated type source.

It is also an object of this invention to provide new and improved optical apparatus for photometric devices for allowing the accurate testing of both small and large samples.

It is also an object of this invention to provide for new and improved optical apparatus for photometric devices including interchangeable focusing and pseudo collimating optical systems.

It is still a further object of this invention to provide new and improved optical apparatus for photometric devices including interchangeable focusing and collimating systems which are focused to illuminate substantially the same portion of a photosensitive device.

The apparatus of the invention provides a means for effectively collimating radiation rays from a source of radiation having an elongated shape, wherein one dimension is substantially greater than the other, such as a rectangular shape exit slit generally employed with monochromator type devices. The apparatus includes a lens means for providing a pseudo collimating effect having first and second major surfaces for controlling the path of rays of radiation applied thereto. The first surface has a cylindrical shape while the second surface has a symmetrical shape such as a sphere or parabola. The lens means is mounted with respect to the source of radiation so that the cylindrical axis of the first surface lies in a plane substantially normal to the larger dimension of the elongated source. The lens means functions to effectively collimate the rays emanating from the source through a sample compartment.

A further feature of the invention includes means for substituting a first focusing lens for the pseudo collimating lens that focuses the image of the elongated source within the sample compartment for testing small samples. A second focusing lens is also included in the apparatus that receives the collimated or focused rays of radiation transmitted through the sample compartment by the pseudo collimating lens or the first focusing lens respectively and applies either beam to substantially the same portion of a radiation sensitive device for detecting the intensity of the radiation transmitted through the sample compartment.

The novel features which are considered to be characteristic of this invention are set forth with particularity in the appended claims. The invention itself, however, both as to its organization and method of operation as well as additional objects and advantages thereof, will best be understood from the following description when read in connection with the accompanying drawings in which:

FIG. 2 is a perspective view of the pseudo collimating lens and aperture means of FIG. 1 and mounted thereof.

FIG. 3 is a perspective view of the pseudo collimating lens of FIG. 1.

FIG. 4 is a cross sectional view of the pseudo collimating lens of FIG. 3 taken along the line 4—4.

FIG. 5 is a top view of the pseudo collimating lens of FIG. 3.

FIG. 6 is a cross sectional view of a first focusing lens of FIG. 1.

FIG. 7 is a perspective view of the focusing action of the focusing lens of FIG. 1.

FIG. 8 is a perspective view showing the collimating effect of the pseudo collimating lens and aperture means of FIG. 1.

Figure 1A:
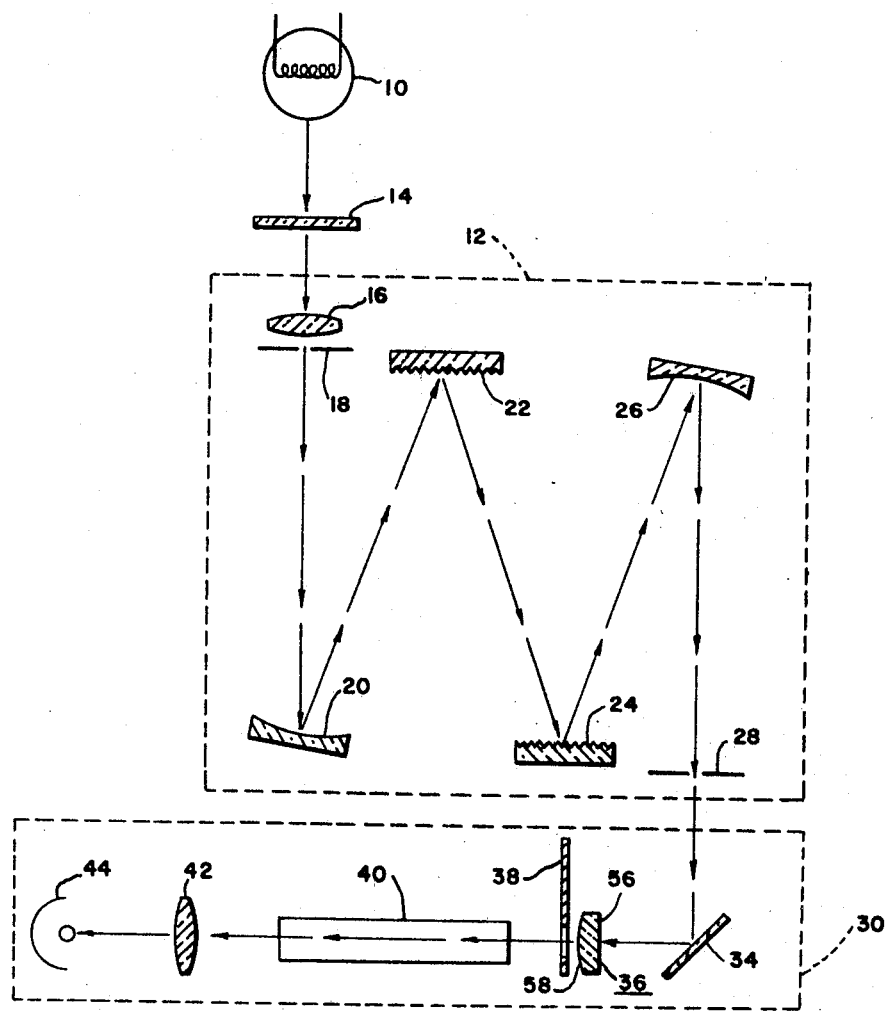
FIG. 1a is a schematic diagram of the optical system of a spectrophotometer including the invention.

The spectrophotometer of FIGURE 1a includes a source of radiation illustrated as a lamp 10 applying radiation to a double grating type monochromator 12 through a filter 14. The radiation received by the monocromator 12 passes through a first collective lens 16, the entrance slit 18, and is reflected from a spherical mirror 20 onto a first diffraction grating 22. The beam is dispersed by the first diffraction grating 22 and is then incident on a second diffraction grating 24 whereby it is further diffracted. The diffracted beam of radiation is then reflected from a second spherical mirror 26 and transmitted through the exit slit 28 toward the optical assembly of the sample compartment of the spectrophotometer.

As previously mentioned, the exit slit 28 of the monochromator device generally takes the shape of an elongated rectangular opening (see FIGS. 7 and 8). One dimension of the slit (referred to for purposes of illustration as slit height located in the Y axis of FIGURES 7 and 8) is generally substantially greater than the other (referred to slit width located in the X axis in FIGURES 7 and 8) so that the width of the slit controls the wavelength band width of the beam of radiation, while the height determines the amount of radiant flux in the beam. Although the invention will be described in context of a rectangular shaped secondary source of radiation, it is to be understood, however, that the concepts are more generally applicable to elongated shaped sources in general such as triangular, elliptical, etc.

Figure 1B:
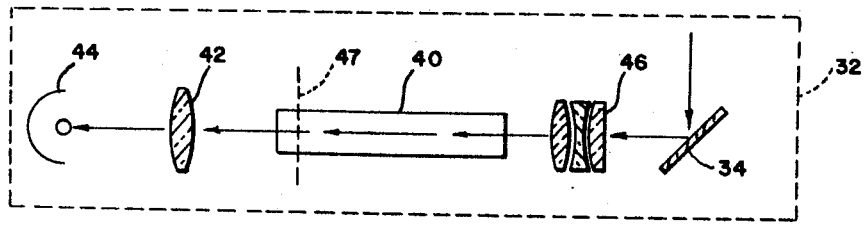
FIG. 1b is a schematic diagram of a second embodiment according to the present invention.

Two embodiments of a sample compartment optical assembly for the spectrophotometer are shown in FIGURE 1a and FIGURE 1b. A first embodiment, included in the dashed line block 30, provides a system for effectively collimating the rays emerging from the exit slit 28 through the sample compartment 40 for testing large samples. The second embodiment, (FIGURE 1b) included in the dashed line block 32, provides a focusing system for focusing the image of the exit slit 28 within the sample compartment 40 for testing of small samples.

The collimating system 30 includes a mirror 34 receiving radiation from the exit slit 28 and reflecting the rays through a pseudo collimating lens 36, aperture means 38, a sample compartment 40, and a focusing lens 42 to a photosensitive device 44. The lens 36 is referred to as a pseudo collimating lens because it does not provide a true collimating effect as the conventional collimating lenses, but rather a partial converging and partial collimating effect to provide an essentially collimated beam from an elongated source in a manner as set forth in a later portion of the specification. The focusing system 32 includes the same components as the collimating system except that the pseudo collimating lens 36 and aperture means 38 are replaced by a focusing lens 46. In the focusing system, focusing lens 46 focuses a sharp image of the exit slit 28 at an image plane 47 within the sample compartment 40.

FIG. 2 shows an embodiment of means for mounting the pseudo collimating lens 36 and the aperture means 38 of FIG. 1. The mounting means includes a thick-walled cylinder 48 in which the lens 36 is mounted at the center. A screw 50 extends through the cylinder 48 for mounting the cylinder in place. The aperture means 38 is illustrated as a circular disk formed with a plurality of holes 52 of different diameters arranged in a concentric circle about the center of the disk through which a mounting screw 54 mounts the disk to the cylinder 48. By rotating the aperture means 38 the size of the lens aperture can be adjusted. The mounting means for the focusing lens 46 includes a thick-walled cylinder and mounting screw similar to that illustrated in FIG. 2 (without the aperture means 38) so that the focusing lens 46 can be easily substituted for that of the combination of the pseudo collimating lens 36 and the aperture means 38.

Referring now to FIGS. 1a, and 3 to 5, the pseudo collimating lens 36 includes a cylindrically shaped major first surface 56 facing the mirror 34 (shown as having a rectangular shape for purposes of illustration). More specifically, the surface 56 exhibits a radius of curvature as viewed in the Y–Z plane (FIG. 4) while exhibiting a substantially straight line in the X–Z plane (FIG. 5) and having an axis line 59 (shown as a dashed line in FIG. 3) running along the center thereof. A second surface 58 (facing the sample compartment 40) is a uniform or symmetrically curved surface which may take the form of a sphere. parabola, etc. so that surface 58 exhibits essentially the same shape or radius of curvature in the X–Z and Y–Z planes.

The pseudo collimating lens 36 is mounted (with respect to the exit slit 28) so that the radius of curvature in the surface 56 is in the Y–Z plane of the longer dimension of the slit (e.g. the axis line 59 is substantially normal to the longer dimension of the slit height as viewed in FIG. 8). The cylindrical shaped surface 56 and the uniform curved surface 58 cooperate to form an image of the source 28 in the Y–Z plane at an object distance greater than the length of the sample compartment 40, and to effectively collimate the radiation in the Y–Z plane throughout the sample compartment over the range of wavelengths covered by spectrophotometer type apparatus.

With the width of the slit 28 substantially smaller than the height, the radiation in the X–Z plane can be considered to be emanating from a point source so that the uniform curved surface 58 acts as a conventional collimating lens while the cylindrical shaped surface 56 effectively passes the rays in the X–Z plane effectively undeviated. The pseudo collimating lens 36 thereby collimates all the radiation received from the slit 28 through the sample compartment 40 in a manner as illustrated in FIG. 8.

By way of example, with the slit height in the order of 10 millimeters (mm.) slit width in the order of 0.13 to 1.33 mm., with the exit slit 28 being located approximately 200 mm. from the surface 56 of the pseudo collimating lens 36, and with the lens made of fused silica 3 millimeters (mm.) thick at the axis, having the radius of curvature of the surface 56 in the order of 170 mm., the radius curvature of the surface 58 in the order of 93 mm., the lens images the slit 28 at a distance beyond the sample compartment 40. As a result, the lens 36 effectively collimates the radiation received from the slit throughout the sample compartment which in the present embodiment is in the order of 200 mm. long.

FIG. 6 is a cross-sectional view of an embodiment of a first focusing lens 46 for the spectrophotometer of FIG. 1. In the present embodiment the focusing lens is a three element lens, including two converging lenses 70 and 72 and an interposed diverging lens 74. The surfaces 76, 78 and 80 of the lenses 70, 72 and 74, each have a radius of curvature so that the slit 28 is imaged over the range of wavelengths covered by spectrophotometer type apparatus at an image plane 47 (FIGS. 1 and 7) within the sample compartment 40, which, in the case of the above-mentioned axial distance, at a distance in the order of 190 mm. The focusing lens 46 produces, at unity magnification, an image that is effectively substantially in focus over the wide wavelength testing range.

The second focusing lens 42 is a conventional collective type lens that receives the rays transmitted through the sample compartment 40 and focuses them on the photosensitive device 44 such as a photomultiplier tube. The second focusing lens 42 forms an image of the collimating lens 36, or the focusing lens 46 (whichever is being used) on the photosensitive surface of the device 44. This assures that the image formed on the photosensitive surface will remain at the same axial position regardless of which lens is being used as long as the lens opening in the aperture means 38 is the same size as the focusing lens 46. It is well known that photosensitive devices are notoriously non-uniform regarding spatial sensitivity. It is therefore advantageous to illuminate the same portion of the photosensitive device with both optical systems (focusing the pseudo collimating) to assure the same sensitivity with both systems.

FIG. 7 depicts cross-sections 81 of the beam configuration with the focusing lens 46 mounted in place. The beam 81 converges from a substantially circular form to an image of the exit slit 28 at the image plane 47, and then diverges beyond this point. Since the image plane is the most constricted segment of the bundle of rays, it is the ideal spot to measure small samples.

With reference to FIG. 8, the collimating system is designed so that all the rays passing through the pseudo collimating lens 36 (with the largest opening in the aperture means 28) would contribute to an image formed at a distance beyond the sample compartment 40. The image size is made equal to the aperture of both the collimating lens 36 and the second focusing lens 42 so that substantially all rays are confined to within this diameter to effectively provide a nearly collimated bundle of rays through the sample compartment 40.

As illustrated by beam cross sections 89 of FIG. 8 the pseudo collimating lens 36 effectively collimates the radiation from the slit 28 into a bundle of rays having nearly uniform cross section and intensity within an envelope with substantially parallel sides across the length of the sample compartment 40. As shown in the figure, the effectively collimated beam of radiation is circular at the front of the compartment having a diameter equal to the chosen aperture in the aperture means 38. The aperture means 38 can be rotated so that the effective aperture of the pseudo collimating lens 36 is greater, equal to or less than the focusing lens 42. The magnification of the pseudo collimating lens 36 is selected so that an image of the slit 28 (formed at a point beyond the sample compartment 40 approaches that of a selected design aperture (i.e. the pseudo collimating lens 36 magnifies the image of the slit height until its size equals the diameter of the design aperture). Accordingly the height of the pseudo collimated beam (the dimensions designated by the arrows 90) at the image plane 47 (merely a reference point in the pseudo collimating system) is substantially constant regardless of the opening 52 selected by the aperture means 38. The width of the beam in the image plane (designated by the arrows 92), however, is approximately equal to the diameter of the selected opening 52 in the aperture means 38. It should be noted, the pseudo collimating lens 36 is particularly useful, if not necessary, for the measurement of thick samples such as long cylindrical cells or thick filters. Greater accuracy is obtained with the pseudo collimating lens 36 for thick samples since the beam will undergo less change when the sample is introduced in a sample compartment 40.

In addition to the foregoing, by selecting components such that slit image distance formed by the pseudo collimating lens 36 is long compared to the length of the sample compartment 40 and long compared to the focal length of the second focusing lens 42, any change in the object position for the second focusing lens 42 due to the sample being tested is minimized. As a result, the dimensional change in the image formed in the photosensitive device 44 is minimized from sample to sample thereby keeping the sensitivity of the spectrophotometer substantially constant.

I claim:
1. In a photometer including an elongated source of radiation having a small dimension in a first plane and a substantially longer dimension in a second plane and a sample compartment for receiving samples to be tested and further including apparatus for effectively collimating at least a portion of the radiation which is transmitted by said source comprising:
   a lens having a major cylindrically shaped surface with a radius of curvature in one plane and a substantially straight shape in a second plane substantially normal to said one plane, said lens further having a second major surface which is uniformly curved and is formed on the portion of the lens opposite to said cylindrically shaped surface,
   means mounting said lens in optical alignment with said elongated source so that said cylindrically shaped surface faces said source and said radius of curvature is substantially in said second plane so that said lens receives radiation from said source and effectively collimates said radiation through said sample compartment, said lens forming an image of said source at a distance beyond said sample compartment,
   photosensitive means, and
   a second lens having a focal length substantially shorter than the focal length of the first said lens receiving said collimated radiation which is transmitted through the sample compartment and focusing said radiation on said photosensitive means.
2. A photometer as defined in claim 1, wherein said second lens focus an image of the other lens on said photosensitive device.

3. A photometer as defined in claim 1 including aperture means mounted adjacent said lens so that said aperture means controls the size of the collimated beam of radiation transmitted through said same compartment in said first plane.

4. A photometer as defined in claim 1 wherein the aperture of said lens and said second lens is approximately the same and said lens forms an image substantially equal in size as said aperture.

References Cited

UNITED STATES PATENTS

| | | | |
|---|---|---|---|
| 2,807,799 | 9/1957 | Rosenthal | 356—100 X |
| 3,013,467 | 12/1961 | Minsky | 356—201 |
| 1,369,764 | 2/1921 | Van Der Biul. | |
| 1,783,481 | 12/1930 | Rayton | 350—190 X |
| 2,453,164 | 11/1948 | Swings. | |
| 2,630,736 | 3/1953 | Beitz. | |
| 2,976,362 | 3/1961 | Stamps | 350—272 X |
| 3,195,405 | 7/1965 | Clark et al. | 350—272 X |

OTHER REFERENCES

Pritchard et al.: New Recording Spectrophotometer, Journal of the Optical Society of America, vol. 45, No. 9, September 1955, p. 691.

RONALD L. WIBERT, Primary Examiner

T. MAJOR, Assistant Examiner